Feb. 11, 1936.  H. S. DAVIS  2,030,246
SIGNALING SYSTEM FOR AUTOMOBILES AND OTHER VEHICLES
Filed Dec. 7, 1933    11 Sheets-Sheet 3

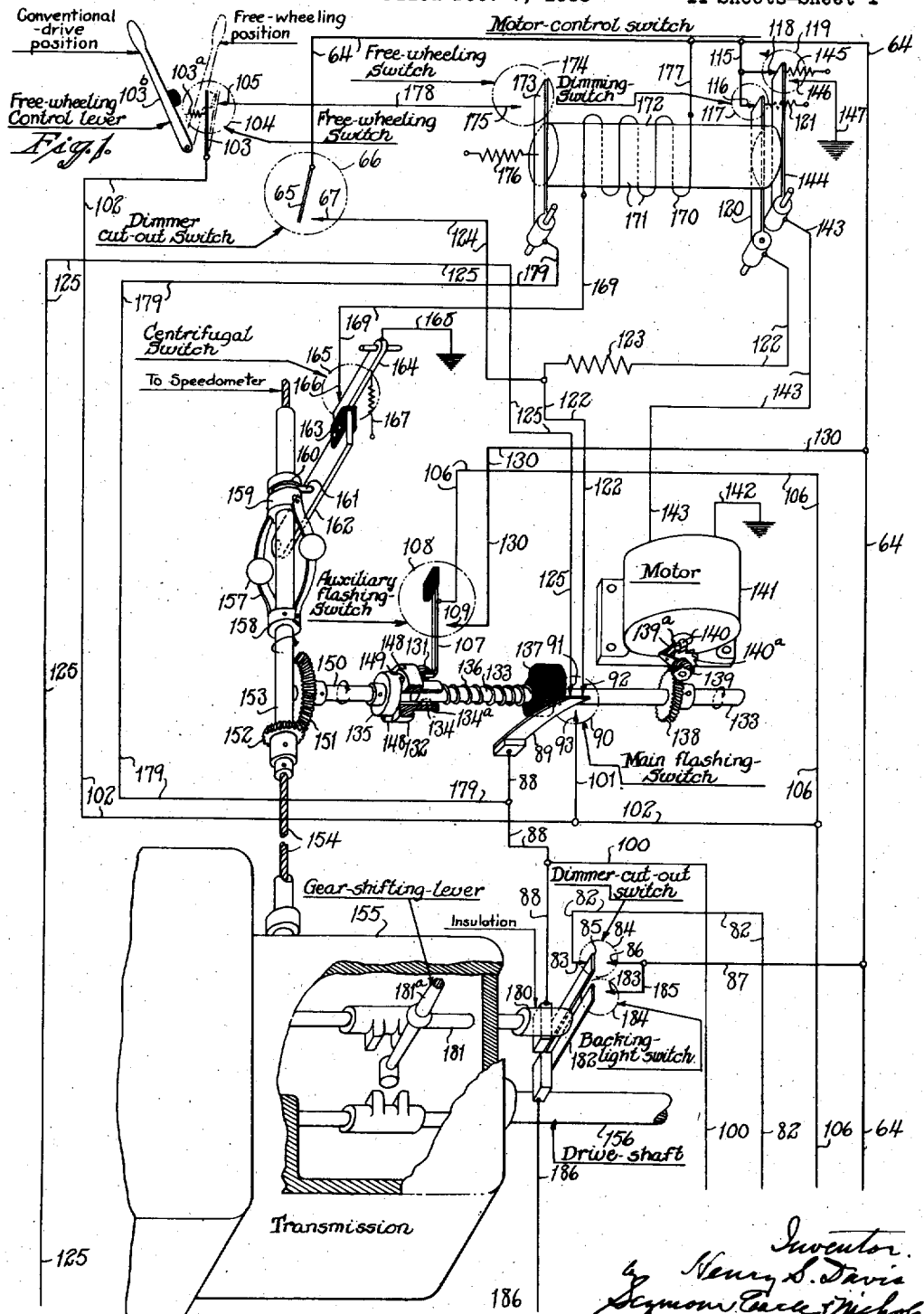

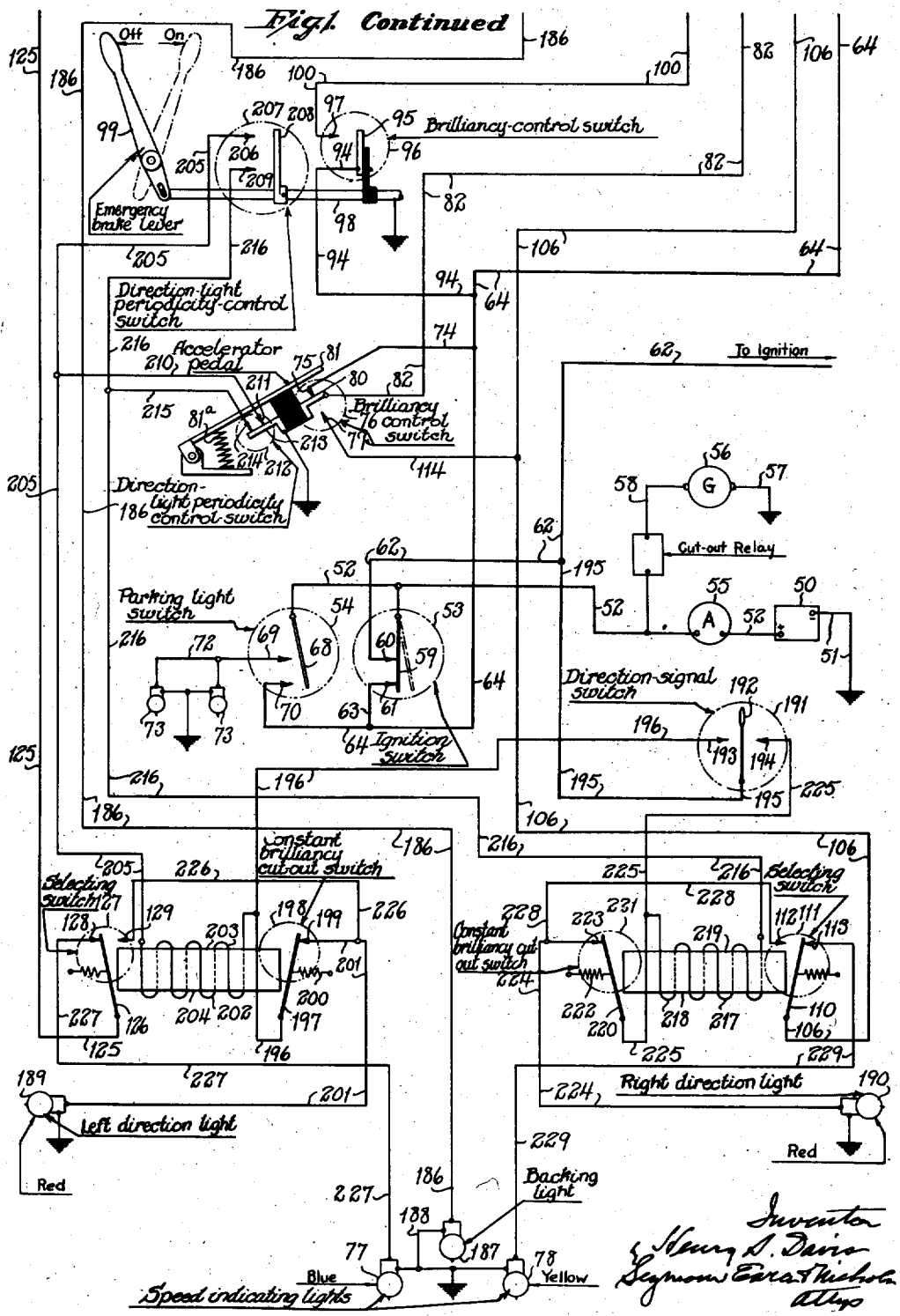

SYMBOLS ——— MAXIMUM BRILLIANCY
——— LESS THAN MAXIMUM BRILLIANCY

*Fig. 2*

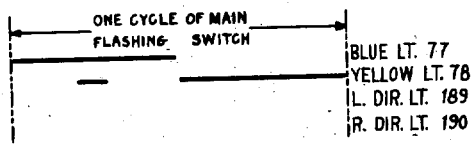

| | |
|---|---|
| VEHICLE | STANDSTILL |
| IGNITION SWITCH | {ON/OFF} |
| PARKING LIGHT SWITCH | ON |
| DIRECTIONAL SIGNAL SWITCH | OFF |
| ACCELERATOR | IDLE |
| EMERGENCY BRAKE | {ON/OFF} |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | {ON/OFF} |

*Fig. 3*

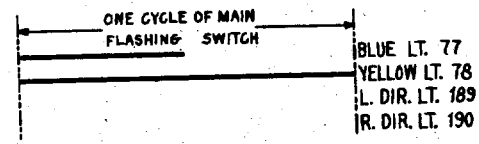

| | |
|---|---|
| VEHICLE | STANDSTILL |
| IGNITION SWITCH | ON |
| PARKING LIGHT SWITCH | {ON/OFF} |
| DIRECTIONAL SIGNAL SWITCH | OFF |
| ACCELERATOR | OPERATED |
| EMERGENCY BRAKE | ON |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | {ON/OFF} |

*Fig. 4*

| | |
|---|---|
| VEHICLE | 0 TO 10 MPH |
| IGNITION SWITCH | ON |
| PARKING LIGHT SWITCH | {ON/OFF} |
| DIRECTIONAL SIGNAL SWITCH | OFF |
| ACCELERATOR | IDLE |
| EMERGENCY BRAKE | {ON/OFF} |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | {ON/OFF} |

*Fig. 5*

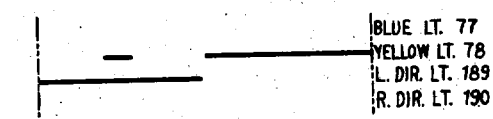

| | |
|---|---|
| VEHICLE | 0 TO 10 MPH |
| IGNITION SWITCH | ON |
| PARKING LIGHT SWITCH | {ON/OFF} |
| DIRECTIONAL SIGNAL SWITCH | ON LEFT |
| ACCELERATOR | IDLE |
| EMERGENCY BRAKE | {ON/OFF} |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | {ON/OFF} |

Inventor
Henry S. Davis
Seymour Earle Nichols
Attys

Feb. 11, 1936.   H. S. DAVIS   2,030,246
SIGNALING SYSTEM FOR AUTOMOBILES AND OTHER VEHICLES
Filed Dec. 7, 1933   11 Sheets-Sheet 4

_Fig. 6._

```
|————————————         |BLUE  LT. 77
                      |YELLOW LT. 78
   —   ————————       |L. DIR. LT. 189
|————————————         |R. DIR. LT. 190
```

| | |
|---|---|
| VEHICLE | 0 TO 10 MPH |
| IGNITION SWITCH | ON |
| PARKING LIGHT SWITCH | {ON/OFF} |
| DIRECTIONAL SIGNAL SWITCH | ON RIGHT |
| ACCELERATOR | IDLE |
| EMERGENCY BRAKE | {ON/OFF} |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | {ON/OFF} |

_Fig. 7._

```
|————————————         |BLUE  LT. 77
          —           |YELLOW LT. 78
                      |L. DIR. LT. 189
|————————————         |R. DIR. LT. 190
```

| | |
|---|---|
| VEHICLE | 0 TO 10 MPH |
| IGNITION SWITCH | ON |
| PARKING LIGHT SWITCH | {ON/OFF} |
| DIRECTIONAL SIGNAL SWITCH | OFF |
| ACCELERATOR | OPERATED |
| EMERGENCY BRAKE | OFF |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | OFF |

_Fig. 8._

```
|————————————         |BLUE  LT. 77
           —          |YELLOW LT. 78
|————————————         |L. DIR. LT. 189
                      |R. DIR. LT. 190
```

| | |
|---|---|
| VEHICLE | 0 TO 10 MPH |
| IGNITION SWITCH | ON |
| PARKING LIGHT SWITCH | {ON/OFF} |
| DIRECTIONAL SIGNAL SWITCH | ON LEFT |
| ACCELERATOR | OPERATED |
| EMERGENCY BRAKE | OFF |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | OFF |

_Fig. 9._

```
|————————————         |BLUE  LT. 77
          —           |YELLOW LT. 78
                      |L. DIR. LT. 189
|————————————         |R. DIR. LT. 190
```

| | |
|---|---|
| VEHICLE | 0 TO 10 MPH |
| IGNITION SWITCH | ON |
| PARKING LIGHT SWITCH | {ON/OFF} |
| DIRECTIONAL SIGNAL SWITCH | ON RIGHT |
| ACCELERATOR | OPERATED |
| EMERGENCY BRAKE | OFF |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | OFF |

Inventor
Henry S. Davis
Seymour Earle & Nichols
Attys

Feb. 11, 1936.          H. S. DAVIS          2,030,246
SIGNALING SYSTEM FOR AUTOMOBILES AND OTHER VEHICLES
Filed Dec. 7, 1933          11 Sheets-Sheet 5

Fig. 10.

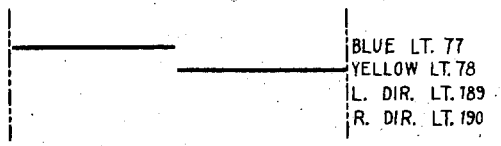

| | |
|---|---|
| VEHICLE | 10 TO 20 MPH |
| IGNITION SWITCH | ON |
| PARKING LIGHT SWITCH | {ON/OFF} |
| DIRECTIONAL SIGNAL SWITCH | OFF |
| ACCELERATOR | IDLE |
| EMERGENCY BRAKE | {ON/OFF} |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | {ON/OFF} |

Fig. 11.

| | |
|---|---|
| VEHICLE | 10 TO 20 MPH |
| IGNITION SWITCH | ON |
| PARKING LIGHT SWITCH | {ON/OFF} |
| DIRECTIONAL SIGNAL SWITCH | ON LEFT |
| ACCELERATOR | IDLE |
| EMERGENCY BRAKE | {ON/OFF} |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | {ON/OFF} |

Fig. 12.

| | |
|---|---|
| VEHICLE | 10 TO 20 MPH |
| IGNITION SWITCH | ON |
| PARKING LIGHT SWITCH | {ON/OFF} |
| DIRECTIONAL SIGNAL SWITCH | ON RIGHT |
| ACCELERATOR | IDLE |
| EMERGENCY BRAKE | {ON/OFF} |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | {ON/OFF} |

Fig. 13.

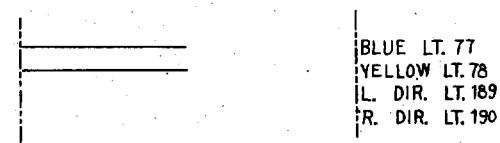

| | |
|---|---|
| VEHICLE | 10 TO 20 MPH |
| IGNITION SWITCH | ON |
| PARKING LIGHT SWITCH | {ON/OFF} |
| DIRECTIONAL SIGNAL SWITCH | OFF |
| ACCELERATOR | OPERATED. |
| EMERGENCY BRAKE | OFF |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | OFF |

Inventor
Henry S. Davis
Seymour Earle & Nichols
attys

Feb. 11, 1936.  H. S. DAVIS  2,030,246
SIGNALING SYSTEM FOR AUTOMOBILES AND OTHER VEHICLES
Filed Dec. 7, 1933  11 Sheets-Sheet 6

*Fig. 14.*

| | |
|---|---|
| VEHICLE | 10 TO 20 MPH |
| IGNITION SWITCH | ON |
| PARKING LIGHT SWITCH | {ON/OFF} |
| DIRECTIONAL SIGNAL SWITCH | ON LEFT |
| ACCELERATOR | OPERATED |
| EMERGENCY BRAKE | OFF |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | OFF |

*Fig. 15.*

| | |
|---|---|
| VEHICLE | 10 TO 20 MPH |
| IGNITION SWITCH | ON |
| PARKING LIGHT SWITCH | {ON/OFF} |
| DIRECTIONAL SIGNAL SWITCH | ON RIGHT |
| ACCELERATOR | OPERATED |
| EMERGENCY BRAKE | OFF |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | OFF |

*Fig. 16.*

| | |
|---|---|
| VEHICLE | 20 TO MAX. MPH |
| IGNITION SWITCH | ON |
| PARKING LIGHT SWITCH | {ON/OFF} |
| DIRECTIONAL SIGNAL SWITCH | OFF |
| ACCELERATOR | IDLE |
| EMERGENCY BRAKE | {ON/OFF} |
| TRANSMISSION MECHANISM | {NEUTRAL/FORWARD} |
| FREE WHEELING MECHANISM | CONVENTIONAL |
| MAN. DIMMER CUT-OUT SWITCH | {ON/OFF} |

*Fig. 17.*

| | |
|---|---|
| VEHICLE | 20 TO MAX. MPH |
| IGNITION SWITCH | ON |
| PARKING LIGHT SWITCH | {ON/OFF} |
| DIRECTIONAL SIGNAL SWITCH | ON LEFT |
| ACCELERATOR | IDLE |
| EMERGENCY BRAKE | {ON/OFF} |
| TRANSMISSION MECHANISM | {NEUTRAL/FORWARD} |
| FREE WHEELING MECHANISM | CONVENTIONAL |
| MAN. DIMMER CUT-OUT SWITCH | {ON/OFF} |

Inventor
Henry S. Davis
Seymour Earl & Nichols
Attys

Feb. 11, 1936.   H. S. DAVIS   2,030,246
SIGNALING SYSTEM FOR AUTOMOBILES AND OTHER VEHICLES
Filed Dec. 7, 1933    11 Sheets-Sheet 7

*Fig. 18.*

| VEHICLE | 20 TO MAX. MPH |
|---|---|
| IGNITION SWITCH | ON |
| PARKING LIGHT SWITCH | [ON/OFF] |
| DIRECTIONAL SIGNAL SWITCH | ON RIGHT |
| ACCELERATOR | IDLE |
| EMERGENCY BRAKE | [ON/OFF] |
| TRANSMISSION MECHANISM | [NEUTRAL/FORWARD] |
| FREE WHEELING MECHANISM | CONVENTIONAL |
| MAN. DIMMER CUT-OUT SWITCH | [ON/OFF] |

*Fig. 19.*

| VEHICLE | 20 TO MAX. MPH |
|---|---|
| IGNITION SWITCH | ON |
| PARKING LIGHT SWITCH | [ON/OFF] |
| DIRECTIONAL SIGNAL SWITCH | OFF |
| ACCELERATOR | IDLE |
| EMERGENCY BRAKE | [ON/OFF] |
| TRANSMISSION MECHANISM | [NEUTRAL/FORWARD] |
| FREE WHEELING MECHANISM | FREE WHEELING |
| MAN. DIMMER CUT-OUT SWITCH | [ON/OFF] |

*Fig. 20.*

| VEHICLE | 20 TO MAX. MPH |
|---|---|
| IGNITION SWITCH | ON |
| PARKING LIGHT SWITCH | [ON/OFF] |
| DIRECTIONAL SIGNAL SWITCH | ON LEFT |
| ACCELERATOR | IDLE |
| EMERGENCY BRAKE | [ON/OFF] |
| TRANSMISSION MECHANISM | [NEUTRAL/FORWARD] |
| FREE WHEELING MECHANISM | FREE WHEELING |
| MAN. DIMMER CUT-OUT SWITCH | [ON/OFF] |

*Fig. 21.*

| VEHICLE | 20 TO MAX. MPH |
|---|---|
| IGNITION SWITCH | ON |
| PARKING LIGHT SWITCH | [ON/OFF] |
| DIRECTIONAL SIGNAL SWITCH | ON RIGHT |
| ACCELERATOR | IDLE |
| EMERGENCY BRAKE | [ON/OFF] |
| TRANSMISSION MECHANISM | [NEUTRAL/FORWARD] |
| FREE WHEELING MECHANISM | FREE WHEELING |
| MAN. DIMMER CUT-OUT SWITCH | [ON/OFF] |

Inventor
Henry S. Davis
Seymour Earle & Nichols
atty

Feb. 11, 1936.   H. S. DAVIS   2,030,246
SIGNALING SYSTEM FOR AUTOMOBILES AND OTHER VEHICLES
Filed Dec. 7, 1933   11 Sheets-Sheet 8

_Fig.22._                                          _Fig.23._

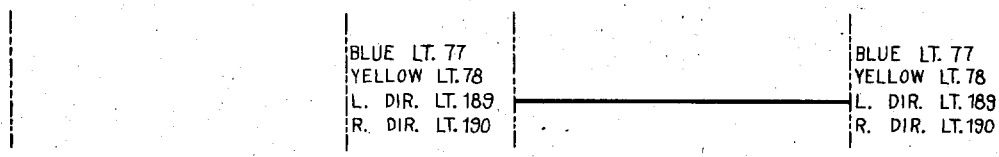

| | |
|---|---|
| VEHICLE | 20 TO MAX. MPH |
| IGNITION SWITCH | ON |
| PARKING LIGHT SWITCH | {ON/OFF} |
| DIRECTIONAL SIGNAL SWITCH | OFF |
| ACCELERATOR | OPERATED |
| EMERGENCY BRAKE | OFF |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | OFF |

| | |
|---|---|
| VEHICLE | 20 TO MAX. MPH |
| IGNITION SWITCH | ON |
| PARKING LIGHT SWITCH | {ON/OFF} |
| DIRECTIONAL SIGNAL SWITCH | ON LEFT |
| ACCELERATOR | OPERATED |
| EMERGENCY BRAKE | OFF |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | OFF |

_Fig.24._                                          _Fig.25._

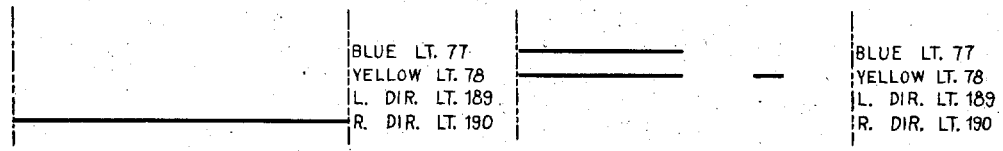

| | |
|---|---|
| VEHICLE | 20 TO MAX. MPH |
| IGNITION SWITCH | ON |
| PARKING LIGHT SWITCH | {ON/OFF} |
| DIRECTIONAL SIGNAL SWITCH | ON RIGHT |
| ACCELERATOR | OPERATED |
| EMERGENCY BRAKE | OFF |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | OFF |

| | |
|---|---|
| VEHICLE | 0 TO 10 MPH |
| IGNITION SWITCH | ON |
| PARKING LIGHT SWITCH | {ON/OFF} |
| DIRECTIONAL SIGNAL SWITCH | OFF |
| ACCELERATOR | OPERATED |
| EMERGENCY BRAKE | OFF |
| TRANSMISSION MECHANISM | {NEUTRAL/FORWARD} |
| FREE WHEELING MECHANISM | {CONVENTIONAL/FREE WHEELING} |
| MAN. DIMMER CUT-OUT SWITCH | ON |

Inventor
Henry S. Davis
Seymour Earee & Nichols
Attys.

Feb. 11, 1936.  H. S. DAVIS  2,030,246

SIGNALING SYSTEM FOR AUTOMOBILES AND OTHER VEHICLES

Filed Dec. 7, 1933  11 Sheets-Sheet 9

*Fig. 26.*

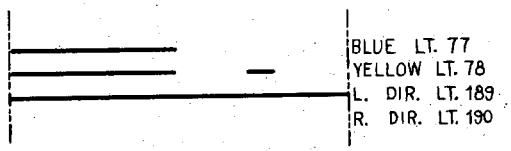

| | BLUE LT. 77 |
| --- | --- |
| | YELLOW LT. 78 |
| | L. DIR. LT. 189 |
| | R. DIR. LT. 190 |

| VEHICLE | 0 TO 10 MPH |
| --- | --- |
| IGNITION SWITCH | ON |
| PARKING LIGHT SWITCH | [ON/OFF] |
| DIRECTIONAL SIGNAL SWITCH | ON LEFT |
| ACCELERATOR | OPERATED |
| EMERGENCY BRAKE | OFF |
| TRANSMISSION MECHANISM | [NEUTRAL/FORWARD] |
| FREE WHEELING MECHANISM | [CONVENTIONAL/FREE WHEELING] |
| MAN. DIMMER CUT-OUT SWITCH | ON |

*Fig. 27.*

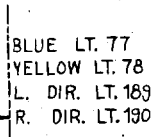

| | BLUE LT. 77 |
| --- | --- |
| | YELLOW LT. 78 |
| | L. DIR. LT. 189 |
| | R. DIR. LT. 190 |

| VEHICLE | 0 TO 10 MPH |
| --- | --- |
| IGNITION SWITCH | ON |
| PARKING LIGHT SWITCH | [ON/OFF] |
| DIRECTIONAL SIGNAL SWITCH | ON RIGHT |
| ACCELERATOR | OPERATED |
| EMERGENCY BRAKE | OFF |
| TRANSMISSION MECHANISM | [NEUTRAL/FORWARD] |
| FREE WHEELING MECHANISM | [CONVENTIONAL/FREE WHEELING] |
| MAN. DIMMER CUT-OUT SWITCH | ON |

*Fig. 28.*

| | BLUE LT. 77 |
| --- | --- |
| | YELLOW LT. 78 |
| | L. DIR. LT. 189 |
| | R. DIR. LT. 190 |

| VEHICLE | 10 TO MAX. MPH |
| --- | --- |
| IGNITION SWITCH | ON |
| PARKING LIGHT SWITCH | [ON/OFF] |
| DIRECTIONAL SIGNAL SWITCH | OFF |
| ACCELERATOR | OPERATED |
| EMERGENCY BRAKE | OFF |
| TRANSMISSION MECHANISM | [NEUTRAL/FORWARD] |
| FREE WHEELING MECHANISM | [CONVENTIONAL/FREE WHEELING] |
| MAN. DIMMER CUT-OUT SWITCH | ON |

*Fig. 29.*

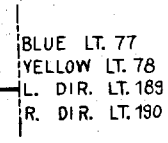

| | BLUE LT. 77 |
| --- | --- |
| | YELLOW LT. 78 |
| | L. DIR. LT. 189 |
| | R. DIR. LT. 190 |

| VEHICLE | 10 TO MAX. MPH |
| --- | --- |
| IGNITION SWITCH | ON |
| PARKING LIGHT SWITCH | [ON/OFF] |
| DIRECTIONAL SIGNAL SWITCH | ON LEFT |
| ACCELERATOR | OPERATED |
| EMERGENCY BRAKE | OFF |
| TRANSMISSION MECHANISM | [NEUTRAL/FORWARD] |
| FREE WHEELING MECHANISM | [CONVENTIONAL/FREE WHEELING] |
| MAN. DIMMER CUT-OUT SWITCH | ON |

Inventor
Henry S. Davis
Seymour Earle & Nichols
Attys

Feb. 11, 1936.                    H. S. DAVIS                    2,030,246
              SIGNALING SYSTEM FOR AUTOMOBILES AND OTHER VEHICLES
                      Filed Dec. 7, 1933            11 Sheets-Sheet 10

Fig. 30.

BLUE  LT. 77
                                        YELLOW LT. 78
                                        L. DIR. LT. 189
                                        R. DIR. LT. 190

VEHICLE                       10 TO MAX. MPH
IGNITION SWITCH               ON
PARKING LIGHT SWITCH          {ON/OFF}
DIRECTIONAL SIGNAL SWITCH     ON. RIGHT
ACCELERATOR                   OPERATED
EMERGENCY BRAKE               OFF
TRANSMISSION MECHANISM        {NEUTRAL/FORWARD}
FREE WHEELING MECHANISM       {CONVENTIONAL/FREE WHEELING}
MAN. DIMMER CUT-OUT SWITCH    ON

Fig. 31.

WHITE LT. 187
                                        BLUE  LT. 77
                                        YELLOW LT. 78
                                        L. DIR. LT. 189
                                        R. DIR. LT. 190

VEHICLE                       {STANDSTILL/BACKWARD}
IGNITION SWITCH               ON
PARKING LIGHT SWITCH          {ON/OFF}
DIRECTIONAL SIGNAL SWITCH     OFF
ACCELERATOR                   {IDLE/OPERATED}
EMERGENCY BRAKE               {ON/OFF}
TRANSMISSION MECHANISM        REVERSE
FREE WHEELING MECHANISM       CONVENTIONAL
MAN. DIMMER CUT-OUT SWITCH    {ON/OFF}

Fig. 32.

WHITE LT. 187
                                        BLUE  LT. 77
                                        YELLOW LT. 78
                                        L. DIR. LT. 189
                                        R. DIR. LT. 190

VEHICLE                       {STANDSTILL/BACKWARD}
IGNITION SWITCH               ON
PARKING LIGHT SWITCH          {ON/OFF}
DIRECTIONAL SIGNAL SWITCH     ON LEFT
ACCELERATOR                   IDLE
EMERGENCY BRAKE               {ON/OFF}
TRANSMISSION MECHANISM        REVERSE
FREE WHEELING MECHANISM       CONVENTIONAL
MAN. DIMMER CUT-OUT SWITCH    {ON/OFF}

Fig. 33.

WHITE LT. 187
                                        BLUE  LT. 77
                                        YELLOW LT. 78
                                        L. DIR. LT. 189
                                        R. DIR. LT. 190

VEHICLE                       {STANDSTILL/BACKWARD}
IGNITION SWITCH               ON
PARKING LIGHT SWITCH          {ON/OFF}
DIRECTIONAL SIGNAL SWITCH     ON RIGHT
ACCELERATOR                   IDLE
EMERGENCY BRAKE               {ON/OFF}
TRANSMISSION MECHANISM        REVERSE
FREE WHEELING MECHANISM       CONVENTIONAL
MAN. DIMMER CUT-OUT SWITCH    {ON/OFF}

Inventor
                                          Henry S. Davis
                                    Seymour Earle & Nichols
                                                  Attys Feb. 11, 1936.   H. S. DAVIS   2,030,246

SIGNALING SYSTEM FOR AUTOMOBILES AND OTHER VEHICLES

Filed Dec. 7, 1933   11 Sheets-Sheet 11

*Fig. 34.*

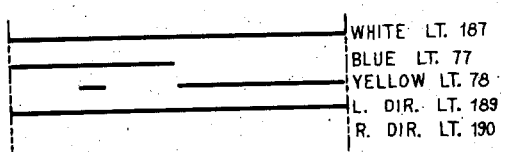

| | |
|---|---|
| | WHITE LT. 187 |
| | BLUE LT. 77 |
| | YELLOW LT. 78 |
| | L. DIR. LT. 189 |
| | R. DIR. LT. 190 |

| | |
|---|---|
| VEHICLE | {STANDSTILL / BACKWARD} |
| IGNITION SWITCH | ON |
| PARKING LIGHT SWITCH | {ON / OFF} |
| DIRECTIONAL SIGNAL SWITCH | ON LEFT |
| ACCELERATOR | OPERATED |
| EMERGENCY BRAKE | OFF |
| TRANSMISSION MECHANISM | REVERSE |
| FREE WHEELING MECHANISM | CONVENTIONAL |
| MAN. DIMMER CUT-OUT SWITCH | {ON / OFF} |

*Fig. 35.*

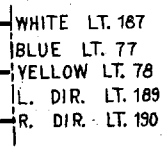

| | |
|---|---|
| | WHITE LT. 187 |
| | BLUE LT. 77 |
| | YELLOW LT. 78 |
| | L. DIR. LT. 189 |
| | R. DIR. LT. 190 |

| | |
|---|---|
| VEHICLE | {STANDSTILL / BACKWARD} |
| IGNITION SWITCH | ON |
| PARKING LIGHT SWITCH | {ON / OFF} |
| DIRECTIONAL SIGNAL SWITCH | ON RIGHT |
| ACCELERATOR | OPERATED |
| EMERGENCY BRAKE | OFF |
| TRANSMISSION MECHANISM | REVERSE |
| FREE WHEELING MECHANISM | CONVENTIONAL |
| MAN. DIMMER CUT-OUT SWITCH | {ON / OFF} |

*Fig. 36.*

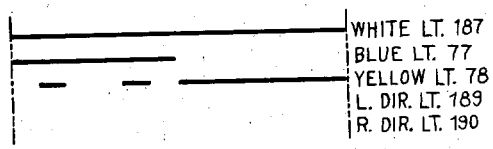

| | |
|---|---|
| | WHITE LT. 187 |
| | BLUE LT. 77 |
| | YELLOW LT. 78 |
| | L. DIR. LT. 189 |
| | R. DIR. LT. 190 |

| | |
|---|---|
| VEHICLE | BACKWARD |
| IGNITION SWITCH | ON |
| PARKING LIGHT SWITCH | {ON / OFF} |
| DIRECTIONAL SIGNAL SWITCH | OFF |
| ACCELERATOR | {IDLE / OPERATED} |
| EMERGENCY BRAKE | {ON / OFF} |
| TRANSMISSION MECHANISM | REVERSE |
| FREE WHEELING MECHANISM | CONVENTIONAL |
| MAN. DIMMER CUT-OUT SWITCH | {ON / OFF} |

Inventor
Henry S. Davis
Seymour Earle & Nichols
Attys

Patented Feb. 11, 1936

2,030,246

UNITED STATES PATENT OFFICE 2,030,246

SIGNALING SYSTEM FOR AUTOMOBILES AND OTHER VEHICLES

Henry S. Davis, West Haven, Conn.

Application December 7, 1933, Serial No. 701,280

33 Claims. (Cl. 177—311)

The invention relates to an improvement in signaling systems and particularly to signaling systems for automobiles and other vehicles.

One of the objects of the present invention is to provide reliable and effective automatic means, whereby the conditions under which a vehicle is being operated will be indicated to extraneous observers, that is to say, observers outside of the vehicle such, for instance, as drivers of other automobiles, pedestrians, etc.

Another object is to provide superior automatic means whereby an observer extraneous to the vehicle is informed of the intent of the driver of a vehicle before the vehicle is set in motion.

A further object is to provide superior means which will automatically indicate to those outside the vehicle, changes in the condition of the operating features of the vehicle, as such changes may take place.

A still further object is to provide superior signaling means, whereby the approximate speed of the vehicle will be indicated to an observer outside of the vehicle.

Another object is to provide means whereby conditions of acceleration or retardation or both will be indicated to extraneous observers.

Still another object is to provide superior automatic signaling means for indicating the intended direction of travel of the vehicle.

A further object is to provide improved signaling means combining certain of the features above referred to.

Other objects and advantages will appear to those skilled in the art from the following, considered in conjunction with the accompanying drawings and appended claims.

In the accompanying drawings:

Fig. 1 is a schematic and diagrammatic illustration of one form which a signaling system may assume in accordance with the present invention; and Figs. 2 to 36 inclusive are diagrammatic views respectively representing the action of the various signal lights in response to various combinations of settings of the operating features of an automobile.

The particular signaling system herein chosen for the illustration of the present invention includes the usual storage battery 50 having one of its terminals connected in the usual manner by a conductor 51 to a ground. The opposite terminal of the storage battery 50 is connected by means of a wire 52 to an ignition switch generally designated by the numeral 53 and to a parking-light switch generally designated by the numeral 54, the usual ammeter 55 being interposed in the wire 52 as shown. In conjunction with the storage battery 50 a generator 56 is employed, one terminal of which is connected by a wire 57 to a ground, while the other terminal of the said generator is connected by a wire 58 to the wire 52 leading to the ignition and parking-light switches 53 and 54 respectively, as before described.

The ignition switch which has been generally designated by the numeral 53 includes a blade 59 electrically connected to the wire 52 as shown and adapted when in its closed position to electrically engage contacts 60 and 61, the contact 60 being connected by means of a wire 62 to the ignition system (not shown) of an automobile. The contact 61 of the said ignition switch constitutes an "extra contact", so to speak, inasmuch as it does not form a feature of an ordinary ignition switch, and is connected by means of a short wire 63 to what, for convenience of description, may be termed a main wire 64 leading eventually to the blade 65 of a manually-operable dimmer-cutout switch generally designated by the numeral 66 and including also a contact 67. The main wire 64, while leading to the dimmer-cutout switch 66 as just described, also has tapped into it various auxiliary wires, as will more fully hereinafter appear.

The parking-light switch 54 above referred to includes a blade 68 and contacts 69 and 70, the latter has connected to it one end of the main wire 64 just above referred to, while the contact 69 is connected by a wire 72 to the usual pair of parking-lights 73 located at or near the front of the vehicle and, one terminal of each of which is connected to a ground as shown.

Leading off from the main wire 64 above referred to is a wire 74 leading to a contact 75 forming a feature of a switch generally designated by the numeral 76 and which, for convenience of description, may be described as an "accelerator-operated brilliancy-control" switch, for the reason that it is automatically operated by the accelerator of the vehicle and participates in determining the brilliancy of a pair of signal-lights 77 and 78, which may properly be termed "speed-indicating lights." The said lights 77 and 78 are preferably differentially colored as indicated in the accompanying drawings. The brilliancy-control switch 76 just referred to also includes a normally-stationary contact 79 and a movable arm or blade 80, which latter is carried by but insulated from an accelerator-pedal 81, which latter is urged upwardly by a spring 81ª.

Connected to the blade 80 of the brilliancy-control switch 76 just above referred to is a main wire 82 connected at its opposite end to the stationary contact 83 of an automatic dimmer-cutout switch 84 which also includes a flexible blade 85 and a second stationary contact 86 which latter is connected by means of a wire 87 to the main wire 64 before referred to. The flexible blade 85 of the switch 84 is connected by means of a wire 88 to the base of the flexible blade 89 of an automatic main flashing-switch generally designated by the numeral 90 and including, in addition to the said blade 89, contacts 91, 92, and 93.

Connected into the main wire 64 is a wire 94 leading to a blade 95 forming a feature of a brake-operated brilliancy-control switch, generally designated by the numeral 96 and including also a contact 97 engageable by the said blade 95, which latter is carried by but insulated from an emergency-brake pull-rod 98 forming a usual feature of an automobile, and adapted to be operated by a hand-lever 99. The contact 97 of the switch 96 is connected by a main wire 100 to the wire 88 above referred to and hence to the blade 89 of the main flashing-switch 90 and to the blade 85 of the automatic dimmer-cutout switch 84.

The contact 93 of the main flashing-switch 90 before referred to is connected by a wire 101 into a wire 102 connected at one end to the pivotal blade 103 of a manually-operable free-wheeling switch, generally designated by the numeral 104 and including also a contact 105. The said blade 103 is moved into its open-circuit position by means of a spring 103ª and is moved into its closed-circuit position by a lever 103ᵇ constituting the "free-wheeling control" lever of the vehicle. The opposite end of the wire 102 is connected into a main wire 106 which latter is connected at one end to the flexible blade 107 of an auxiliary flashing-switch, generally designated by the numeral 108, and including also a contact 109. The opposite end of the main wire 106 is connected to the pivotal blade 110 of magnetic material of a magnet-operated selecting-switch, generally designated by the numeral 111, and including in addition to the blade 110, contacts 112 and 113. Intermediate its ends the main wire 106 has connected into it a wire 114 leading to the contact 79 of the accelerator-operated brilliancy-control switch 76.

Connected into the main wire 64 adjacent its upper end, as viewed in the drawings, is a wire 115 leading to a normally-stationary contact 116 of a magnet-operated dimming-switch, generally designated by the numeral 117. The said wire 115 extends also to the normally-stationary contact 118 of a magnet-operated motor-control switch, generally designated by the numeral 119.

The magnet-operated dimming-switch 117 includes in addition to the contact 116, above referred to, a pivotal blade 120 of magnetic material and having a spring 121 or equivalent means normally exerting an effort to hold the blade 120 out of engagement with the contact 116. The said blade 120 is in turn connected by a wire 122 to the contact 92 of the main flashing-switch 90 before referred to, and has interposed in it a dimming-resistance 123 acting on occasion to dim the brilliancy of the speed-indicating lights 77 and 78, before referred to, in a manner as will be hereinafter described.

In order to provide a shunt circuit for current from the wire 64 to the contact 92 of the main flashing-switch 90 so that the effect of the dimming-resistance 123 and automatic dimming-switch 117 may be in effect eliminated, I connect to the normally-stationary contact 67 of the manually-operable dimmer-cutout switch 66 a wire 124 which is connected at its opposite end into the wire 122 on the side of the resistance 123 remote from the dimming-switch 117.

The contact 91 of the main flashing-switch 90 is connected by what may be termed a "main wire" 125 to the pivotal blade 126 of magnetic material of a magnet-operated selecting-switch, generally designated by the numeral 127 and including contacts 128 and 129. The said selecting-switch 127 corresponds to the selecting-switch 111 before referred to.

Returning now to the auxiliary flashing-switch 108, the contact 109 thereof is connected by a wire 130 to the main wire 64, and the outer end of its flexible blade 107 is provided with a roller 131 bearing against the rear face of a rotary and reciprocating cam-head 132 mounted upon a secondary shaft 133 for rotation therewith, but with capacity for limited axial movement with respect thereto. The said cam-head 132 is connected to the secondary shaft 133 for the purpose just described, by means of a key 134 and a relatively-long keyway 134ª, and is urged axially toward a complementary rotary cam-head 135 by a helical spring 136 bearing at one end against the said cam-head 132 and at its opposite end against a peripheral cam 137 rigidly secured to the secondary shaft 133 and acting to flex the blade 89 of the main flashing-switch 90 away from the contacts 91 and 92 of the said switch and into engagement with the contact 93 thereof.

On the side of the cam 137, opposite the cam-head 132, the secondary shaft 133 has rigidly secured to it a spiral gear 138 which is meshed into and driven by a spiral pinion 139 loosely mounted at the outer end of a shaft 140 of an electric motor 141, which motor acts when energized to drive the said secondary shaft 133 at a speed corresponding to the speed at which the said shaft would be driven by the movement of the vehicle when the same is traveling forwardly at a rate of ten miles per hour, or some other predetermined speed. The said motor 141 effects the driving of the pinion 139 and hence the driving of the secondary shaft 133 through the intermediary of a suitable ratchet-mechanism which permits the said shaft 133 to be driven independently of the said motor. The ratchet-mechanism herein shown includes a ratchet-wheel 140ª rigidly secured on the motor-shaft 140, and a pawl 139ª pivotally secured to the pinion 139.

The motor 141 has one of its terminals connected by a wire 142 to a suitable ground, and has its complementary terminal connected by means of a wire 143 to a pivotal blade 144 of magnetic material forming a feature of the magnet-operated motor-control switch 119 before referred to. The said blade 144 engages on occasion with the contact 118 of the said switch 119, but is urged by means of a spring 145 into engagement with a contact 146, also forming a feature of the said switch and connected by means of a wire 147 to a ground.

The forward face of the rotary and reciprocating cam-head 132 before referred to is provided with two (more or less) diametrically-opposite wedge-shaped cam-lugs 148—148 adapted on occasion to alternately engage a similarly-shaped cam-lug 149 carried on the adjacent face of the rotary cam-head 135, which latter is rigidly secured to what may be termed a "primary shaft" 150 arranged coaxially with respect to the secondary shaft 133, which latter, however, is rotatable independently of the primary shaft 150 by means of the motor 141 as will be hereinafter described.

When the speed of the secondary shaft 133, under the urge of the motor 141, exceeds the speed of the primary shaft 150, which latter is driven by the vehicle as will hereinafter be described, the sloping faces of the cam-lugs 148—148 of the cam-head 132 will alternately engage the sloping face of the cam-lug 149 of the cam-head 135, so that for each revolution of the secondary shaft 133 in excess of the speed of the primary shaft 150, the rotary and reciprocating cam-head 132 will be twice slid rearwardly axially of the shaft 133 so as to similarly flex the blade 107 of the auxiliary flashing-switch 108 to periodically engage the said blade with the contact 109.

The outer end of the primary shaft 150, above referred to, has rigidly secured to it a bevel gear 151 meshed into and driven by a bevel pinion 152, rigidly secured in turn to a governor shaft 153 extending at a right angle to the axes of the shafts 133 and 150 before referred to. The said governor shaft 153 may be driven in any approved manner from a running feature of the automobile, but as herein shown, the said shaft is driven by a speedometer shaft 154 extending into a transmission-housing 155 and connected in the usual manner (not shown) to the drive-shaft 156 of the automobile. The governor-shaft 153, as thus arranged, is virtually interposed intermediate the ends of the speedometer shaft 154, though as before noted, the governor shaft 153 may be driven in any approved manner from a running feature of the automobile.

The governor shaft 153 has mounted upon it a centrifugal ball governor 157, one of the sleeves 158 of which is rigidly secured to the said shaft, while its complementary sleeve 159 is free to reciprocate upon the said shaft as the weights of the said governor move inwardly and outwardly in the ordinary manner of ball governors.

The reciprocating sleeve 159 of the centrifugal governor 157 is formed with an annular groove 160 receiving a pin 161 projecting from a lever 162 pivoted at its lower end and carrying at its upper end a suitable block 163 of insulation which engages with a pivotal blade 164 forming a feature of what may be termed a "centrifugal switch" 165. The said switch 165 includes also a contact 166 having its blade 164 urged toward the upper end of the lever 162 by a spring 167. The switch-blade 164 of the centrifugal switch 165 is connected by a wire 168 to a suitable ground, while the contact 166 thereof is connected by a wire 169 to one terminal of a helical coil 170 forming a feature of an electromagnet, generally designated by the numeral 171 and including also a magnetic core 172.

One end of the electromagnet 171, above referred to, is located adjacent the respective switch-blades 120 and 144 for magnetically attracting the same, while the opposite end of the said core extends adjacent a blade 173 of magnetic material and forming a feature of a so-called "magnetic free-wheeling switch," generally designated by the numeral 174 and including also a contact 175 and a spring 176, which latter exerts a constant effort to swing the blade 173 outwardly away from the adjacent end of the electromagnet 171.

The opposite terminal of the coil 170 from that connected to the wire 169, is connected by a wire 177 to the main wire 64 before referred to. The contact 175 of the magnetic free-wheeling switch 174, just referred to, is connected by a wire 178 to the contact 105 of the manually-operable free-wheeling switch 104, while the blade 173 is connected by a wire 179 to the wire 88, so that the two said free-wheeling switches 104 and 174 are connected in series.

Returning now to the automatic dimmer-cutout swicth 84, which is mounted adjacent the transmission-housing 155 as shown, the flexible blade 85 of the said switch is adapted on occasion to be engaged by a thrust-shoe 180 for being thereby flexed away from its complementary contact 83 and into engagement with the opposite contact 86 of the dimmer-cutout switch 84. The thrust-shoe 180 is preferably formed of insulating material and is mounted upon the rear end of a gear-shifting slide 181 schematically indicated in the accompanying drawings and forming a usual feature of an automobile transmission and constituting the first-speed and reverse-speed slide thereof.

As the slide 181 of the transmission is moved rearwardly by a conventional gear-shift lever 181a, for shifting the transmission mechanism into reverse, it acts through the intermediary of the thrust-shoe 180 to flex the blade 85, as above described, and also acts to flex a similar blade 182, adjacent the dimmer-cutout switch 84, into engagement with a contact 183 forming a feature, together with the said blade 182, of a backing-light switch, generally designated by the numeral 184, and having the said contact 183 connected by a short wire 185 into the wire 87 leading to the contact 86 of the adjacent dimmer-cutout switch 84.

The flexible blade 182 of the backing-light switch 184 is connected by means of a wire 186 to one terminal of an incandescent lamp bulb 187 or other suitable signal device, which for convenience of description will be referred to as the backing-light. The opposite terminal of the bulb 187 is connected by a wire 188 to an adjacent ground.

For the purpose of selectively energizing a left-direction light 189 and a right-direction light 190 a direction-signal switch is employed which is generally designated by the numeral 191 and includes a blade 192 adapted to alternately engage a left contact 193 and a right contact 194. The said blade 192 may be manually operated directly for energizing the respective signal lights 189 or 190, or the same may be automatically operated, such for instance as by connecting the same to a portion of the steering apparatus of the automobile.

The blade 192 of the direction-signal switch 191 is connected by means of a wire 195 to the wire 62 leading from the ignition switch 53 to the ignition apparatus. The left contact 193 of the switch 191 is connected by means of a wire 196 to a pivotal blade 197 formed of magnetic material and constituting a feature of an automatic switch generally designated by the numeral 198. The said automatic switch 198 may, for convenience of description, be termed a constant-brilliancy cutout-switch which also includes a contact 199 and a spring 200, which latter exerts a constant effort to engage the blade 197 with the said contact 199. The contact 199 of the switch 198 is connected by means of a wire 201 to one of the terminals of the left-direction light 189 before described.

Tapped into the wire 196 is one terminal of a coil 202 forming a feature of an electromagnet, generally designated by the numeral 203, and encircling a core 204 formed of magnetic material, one end of which is located adjacent the pivotal switch-blade 197 of the switch 198 so as to, upon occasion, move the said switch-blade out of engagement with the contact 199. The opposite terminal of the coil 202 is connected by a wire 205 to a contact 206 forming a feature of a direction-light periodicity-control switch, generally designated by the numeral 207. The said switch 207 also includes a switch-blade 208 mounted upon the emergency-brake pull-rod 98 before referred to, and is adapted to simultaneously engage the contact 206, as well as a contact 209, so as to, on occasion, connect the said contacts 206 and 209 to a ground through the intermediary of the said pull-rod 98.

Tapped into the wire 205 just above referred to is a wire 210 extending to a contact 211 forming a feature of a second direction-light periodicity-control switch generally designated by the numeral 212 and including a blade 213 grounded as shown and carried by the accelerator-pedal 81. The said switch 212 includes also a contact 214 engageable by the blade 213 and connected by a wire 215 into a wire 216 extending between the contact 209 of the switch 207 and one terminal of an electromagnet-coil 217. The switch 212 just referred to serves, like the switch 207, to simultaneously "ground" the two wires 205 and 216.

The coil 217 above referred to constitutes a feature of an electromagnet generally designated by the numeral 218 and including also a magnetic core 219.

One end of the electromagnet 218 is located adjacent the magnetic blade 110 of the selecting-switch 111, while its opposite end is located adjacent a pivotal blade 220 formed of magnetic material and constituting a feature of a constant-brilliancy cutout-switch generally designated by the numeral 221. The switch 221 corresponds to the similar switch 198 before described, save that it acts upon the right-direction light 190, rather than upon the left-direction light 189. The switch 221 also includes a spring 222 exerting a constant effort to swing the blade 220 into engagement with a contact 223, which latter is connected by a wire 224 to one terminal of the right-direction light 190. The blade 220 of the switch 221 is connected by a wire 225 to the contact 194 of the direction-signal control-switch 191. The terminal of the electromagnet-coil 217 opposite from that connected to the wire 216 is connected to the wire 225 just referred to.

The selecting-switch 127 has its contact 129 connected by means of a wire 226 to the wire 201 leading from the switch 198, while the complementary contact 128 of the switch 127 is connected by a wire 227 to one terminal of the bulb 77 constituting one of the two complementary speed-indicating lights 77 and 78.

The contact 112 of the selecting-switch 111 is connected by a wire 228 to the wire 224 leading from the contact 223 of the switch 221. The complementary contact 113 of the switch 111 is connected by a wire 229 to one terminal of the speed-indicating light 78 before referred to.

In order that the following description of operation may be made clearer, it seems pertinent to here point out that the apparatus above described, on occasion, will cause the speed-indicating lights 77 and 78 to vary both in brilliancy and in flash-frequency and will also effect the steady energization of the speed-indicating light 78 while at the same time causing the complementary light 77 to flash at variable frequency.

With respect to the direction-lights 189 and 190, under one set of conditions, one or the other of the same will be energized so as to provide what may be termed a "steady" light, both alone and in conjunction with the concurrent flashing of both of the speed-indicating lights 77 and 78. On other occasions, either the left-direction light 189 will be caused to flash in substantial consonance with the speed-indicating light 78, or the right-direction light 190 will be caused to flash in substantial consonance with the speed-indicating light 77.

Furthermore, on other occasions, the left-direction light 189 may be caused to give a flashing signal at the same time that the speed-indicating light 78 is giving steady light. Under still another set of circumstances, one of the direction-lights, such for instance as the light 190, may be steadily energized, while at the same time one of the speed-indicating lights, such for instance as the light 77, is producing a flashing light.

Thus an almost indefinite number of combinations of signals may be provided with the apparatus illustrated to indicate to an extraneous observer the conditions under which a vehicle is being operated, or to indicate the settings of certain operating features of the vehicle when the same is at a standstill.

For the purpose of a clearer understanding of certain of the various combinations of signals and the effects which the setting of the various operating features of the vehicle may have thereon, reference may be had to the graphic charts shown in Figs. 2 to 36 inclusive of the accompanying drawings, the symbols of which will be hereinafter described in detail.

For the purpose of description, let it be presumed that the vehicle is at a standstill and that the operator has turned the ignition-switch 53 into its "on" position and has moved the emergency-brake lever 99 into its "off" position, and further that the various manually-operable "control" features of the automobile are in the positions shown in Fig. 1.

Under the conditions recited, the wire 64 will be supplied with current and will in turn supply current through the short wire 177 to the electromagnet 171, the circuit being completed through the centrifugal switch 165 (now in its closed-circuit position) to a ground. When the electromagnet 171 is energized as just described, it will automatically pull the blade 173 into its open-circuit position and concurrently shift the blades 120 and 144 respectively into engagement with the contacts 116 and 118.

With the blade 144 drawn toward the electromagnet 171 as just described, the circuit will be completed to the motor 141, with the result that the said motor will operate at its predetermined rate of speed, which in the present instance is a speed sufficient to drive the secondary shaft 133 at a speed corresponding to the speed at which it would, under other circumstances, be driven directly by the movement of the vehicle when the same is operating at a speed rate of ten miles per hour.

With the secondary shaft 133 rotating at its ten miles per hour rate of speed, the cam 137 will serve to cause the flexible blade 89 of the main flashing-switch 90 to alternately engage the said blade with the contact 93 on one hand, and then on the other hand, jointly engage the said blade with the contacts 91 and 92, so as to alternately energize the so-called speed-indicating lights 77 and 78 once each during each revolution of the secondary shaft 133, these flashings of the lights 77 and 78 being respectively of equal duration and each enduring during approximately each half-revolution of the said secondary shaft 133.

At the same time that the main flashing-switch 90 is being operated as above described, the cam-head 132 rotating, as it does, with the shaft 133, is periodically slid rearwardly by the coaction of the cam-lugs 148 and 149 twice for each revolution of the said secondary shaft 133 with respect to the primary shaft 150, which latter under the present circumstances is stationary. This reciprocation of the cam-head 132 in turn effects the flexing of the blade 107 of the auxiliary flashing-switch 108 to thus cause the said blade to engage with the contact 109 for relatively brief intervals twice during each revolution of the secondary shaft 133.

Attention may be here called to the fact that the blade 107 of the auxiliary flashing-switch 108 dwells in engagement with the contact 109 for but a very brief interval as compared to the dwells of the blade 89 of the main flashing-switch 90, which latter endure for approximately half of each revolution of the secondary shaft 133.

Thus under the conditions above described, with the auxiliary flashing-switch 108 operating in conjunction with the main flashing-switch 90, the wire 106 will be periodically energized to cause the speed-indicating light 78 to flash for a period of very brief duration as compared to the longer flashes occasioned by the main flashing-switch 90. This brief flashing occurs concurrently with the flashing of the speed-indicating light 77 by the said main flashing-switch 90.

Under the above-described conditions, therefore, during any given revolution of the secondary shaft 133, the speed-indicating light 77 will be caused, during a given half-cycle of the said shaft, to flash during substantially all of such half-cycle and at the same time, at some variable point during this half-cycle flash, the complementary speed-indicating light 78 will very briefly flash. The next half-cycle of operation will cause the light 78 to flash alone during substantially all of such half-cycle.

At this place, attention may be called to the significance of the accompanying charts, Fig. 4 of which indicates the conditions just above described. The gap between the lateral broken-line boundaries represents one complete revolution or cycle of the secondary shaft 133, and hence of the main flashing-switch 90. It will be noted that, as indicated in Fig. 4 referred to, the speed-indicating light 77 is on at maximum brilliancy of the first half-cycle indicated, while the speed-indicating light 78 is on at maximum brilliancy during the remaining half-cycle. It will also be noted that while the light 77 is giving a relatively-long (half-cycle) flash, the light 78 is very briefly illuminated in conjunction therewith by the operation of the auxiliary flashing-switch 108, as above described.

Individual settings of the operating features of the vehicle (some of the settings being optional as is also indicated) are indicated in Fig. 4 (as well as in the other charts).

As a logical next step in the operation of the vehicle, let it be presumed that the operator now proposes to put the vehicle in motion in a direction forwardly and to the left. Under these conditions and before any operation is performed to actually put the vehicle in motion, the operator would throw the blade 192 of the direction-signal switch 191 to the left to engage the same with the contact 193, and thus feed current to the wire 196 leading to the electromagnet 203 and the switch-blade 197 of the constant-brilliancy cutout-switch 198.

By this action, the electromagnet 203 will be energized (the circuit being completed through the now-closed switch 212) with the effect of moving the switch-blade 197 out of engagement with its complementary contact 199, and at the same time shift the blade 126 of the selecting-switch 127 out of engagement with the contact 128 and into engagement with the contact 129. This shifting of the blades 126 and 197 by the action of the electromagnet, as just described, cuts out the speed-indicating light 77 and substitutes therefor the left-direction light 189, which later will now flash alternately with the speed-indicating light 78 as indicated in Fig. 5. Incidentally, during the relatively-long flash of the left-direction light 189, the speed-indicating light 78 will be briefly energized by the auxiliary flashing-switch 108, as before stated, to co-mingle, so to speak, a short flash with the longer flash of the said light 189, all as indicated in Fig. 5 referred to.

In the event that the operator of the vehicle should have intended causing the movement of the vehicle in a direction both forward and to the right (instead of in a direction forwardly and to the left as before described), the operator, under such conditions and before putting the vehicle in motion, would have moved the blade 192 of the direction-signal switch 191 into engagement with the contact 194, under which circumstances the signals would be substantially reversed, inasmuch as the right-direction light 190 would be alternately flashed with the speed-indicating light 77 and would also give a relatively-brief flash during the flashing of the said light 77, as indicated in Fig. 6.

Having described the character of the signals produced when the vehicle is at a standstill with various settings of the direction-light switch 191, let it now be presumed that the vehicle is caused to be moved forwardly and to the left by an appropriate operation of the clutch, etc., and the depression of the accelerator-pedal 81.

The depression of the accelerator-pedal 81, as described, shifts the blade 80, carried by it, out of engagement with the contact 75 and into engagement with the contact 79 of the brilliancy-control switch 76, thus increasing the resistance of the circuits controlled by the main flashing-switch 90 by interposing the dimming-resistance 123 in such circuits, without, however, similarly affecting the circuits controlled by the auxiliary flashing-switch 108.

Concurrently with the depression of the accelerator-pedal 81 and the operation of the switch 76, the periodicity-control switch 212 will be moved into its open-circuit position, to thus interrupt the circuits of both of the electromagnets 203 and 218, and insure that the same will not be energized when the direction-signal switch 191 is closed. This condition insures the steady illumination of the direction-lights 189 and 190 when the switch 191 is subsequently closed.

Under the conditions just above described, the speed-indicating lights 77 and 78 will concurrently flash at less than maximum brilliancy during substantially all of a given half-cycle of operation of the main flashing-switch 90; the auxiliary flashing-switch 108 meanwhile serving to bring the said lights 77 and 78 up to full brilliancy for a very short length of time during the half-cycle just described, all as indicated in Fig. 8. Also, the speed-indicating light 78 will be given a very brief flash of maximum brilliancy during the half-cycle succeeding the half-cycle just above referred to. Meanwhile, during all of the flashing just described, the left-direction light 189 will remain on steadily, as indicated in Fig. 8 referred to.

When the vehicle is in motion, as described, the primary shaft 150 instead of remaining stationary, as theretofore, will now be rotated by the movement of the vehicle itself and in the same direction as the direction in which the secondary shaft 133 is being driven by the motor 141. Thus as the vehicle gathers speed, the relative speeds between the cam-heads 132 and 135 will be proportionately lessened, with the result that the operation of the auxiliary flashing-switch 108 will occur with gradually decreasing frequencies, and the time at which the circuit is closed by the said auxiliary flashing-switch will shift with respect to the time at which the main flashing-switch 90 is effecting the flashes of longer duration under its control.

Thus, under the conditions just described, the auxiliary flashing-switch 108 will cause the flashing of one or more of the lights at frequency-rates which are inversely proportional to the forward speed of the vehicle, i. e., flashes occur with progressively-decreasing frequency as the speed of the vehicle increases its forward speed up to the 10 M. P. H. speed referred to.

When in the increasing speed of the vehicle, the speed thereof reaches ten miles per hour, the primary shaft 150 will then be rotating at the same speed as that at which the secondary shaft 133 is being rotated by the motor 141, whereupon no further relative movement will occur between the cam-heads 132 and 135, so that the said cam-head 132 will no longer be reciprocated and hence the auxiliary flashing-switch 108 will cease to be operated.

As the speed of the vehicle increases above ten miles per hour, the flat face of the cam-lug 149 of the cam-head 135 will engage the flat face of one of the lugs 148 of the cam-head 132 and thus cause the primary shaft 150 to drive the secondary shaft 133 at a one to one ratio and in consonance with the speed of the vehicle. Under such conditions the pawl 139ª and ratchet-wheel 140ª will permit the shaft 133 to run ahead, so to speak, of the motor 141.

Under the conditions now being described, the auxiliary flashing-switch 108 is out of action, but the main flashing-switch 90 is continuously active and its rapidity of action increases with the increasing speed of the secondary shaft 133 under the driving urge of the primary shaft 150, so that the signal now given would correspond to that schematically shown in Fig. 14, wherein both of the speed-indicating lights are shown as flashing concurrently at less than maximum brilliancy during a given half-cycle of the main flashing-switch 90, while the left-direction light 189 remains steadily illuminated.

Now that the speed of the vehicle has attained a forward speed of 10 M. P. H., or slightly more, let it be presumed that the vehicle is turned in a straight-ahead direction rather than in a direction forwardly and to the left as before. Under these conditions, the blade 192 of the direction signal-switch 191 will be thrown into a neutral position to thus cut the direction-lights 189 and 190 out of action. The signals now being given would correspond to those indicated in Fig. 13, being at this time merely the concurrent flashing of the speed-indicating lights 77 and 78 at less than maximum brilliancy for a period of a half-cycle of the main flashing-switch 90.

When now the vehicle attains a predetermined speed, such for instance as 20 M. P. H., the centrifugal switch 165 will be moved into its open-circuit position by the action of the ball governor 157, with the result that the circuit through the coil 170 of the electromagnet 171 will be broken.

Upon the de-energization of the electromagnet 171, the switch-blades 120, 144 and 173 will be released to the action of their respective springs and each will swing away from the adjacent end of the core 172 of the said electromagnet 171.

The retirement of the switch-blade 144 as just above described will serve to disconnect the motor 141 from a source of current-supply and will also serve to ground the same.

The retirement of the blade 120 of the automatic dimming-switch 117 will break the only-now-existing path of current-supply to the speed-indicating lights 77 and 78, whereby the action of the same will be from this point on discontinued until such time as another set-up of the operating features of the automobile is made in the manner as will be hereinafter described.

If during the forward movement of the vehicle as above described (at a rate in excess of 20 M. P. H.), it is desired to make a turn, the blade 192 of the direction signal-switch 191 will be thrown either to the left or right, as the case may be, whereupon either the left or right direction-lights 189 or 190 will be steadily illuminated, as indicated in Figs. 23 and 24 respectively.

In the foregoing description of operation of the vehicle, it has been presumed that the accelerator-pedal 81 has been depressed as before stated to cause the active forward propulsion of the vehicle and that the free-wheeling control-lever 103ᵇ has been in a position to provide the so-called "conventional" or non-free-wheeling drive for the vehicle.

Now if the operator desires to slow up the vehicle, he will remove foot pressure from the accelerator-pedal 81 to permit the same to be retired by its spring 81ª to thus return the blade 80 of the brilliancy-control switch 76 into engagement with the contact 75 and also return the blade 213 of the direction-light periodicity-control switch 212 into engagement with the contacts 211 and 214.

The removal of foot pressure from the accelerator-pedal 81 and the consequent shifting of the blade 80 of the switch 76 as above described will re-establish the flow of current to the main flashing-switch 90 and hence to the speed-indicating lights 77 and 78 controlled thereby.

The speed-indicating lights 77 and 78 will now be alternately flashed (one half-cycle each) at maximum brilliancy in the manner indicated in Fig. 10 until such time as the speed of the vehicle decreases to 10 M. P. H. or less.

If during the diminution in speed of the vehicle as above described to not less than 10 M. P. H., the direction-signal control-switch 191 should be thrown to the left for instance, the electromagnet 203 will be energized to draw the respective switch-blades 126 and 197 toward the core 204 of the said electromagnet, with the effect of causing the left-direction light 189 and the speed-indicating light 78 to be alternately flashed at maximum brilliancy, as indicated in Fig. 11.

If on the other hand the blade 192 of the direction-signal switch 191 should be thrown to the right during the diminution of the speed of the vehicle to not less than 10 M. P. H., the electromagnet 218 will be energized to shift the switch-blades 110 and 220 to thus cause the alternate flashing at maximum brilliancy of the right-direction light 190 and the speed-indicating light 77.

When in the slowing up of the vehicle, the same reaches a speed of less than 10 M. P. H., a speed differential will exist between the vehicle-driven primary-shaft 150 and the secondary shaft 133 which is now being driven by the motor 141; it being understood in this connection that previously when in the diminution in speed of the vehicle the same reached a speed a fraction less than 20 M. P. H., the centrifugal governor 157 acted to re-close the switch 165 and thus re-energize the said motor 141.

The difference in speed now existing between the shafts 150 and 133 will occasion the reciprocating movement of the cam-head 132 and hence the opening and closing of the auxiliary flashing-switch 108 to thus again provide relatively-brief flashes intermingling or alternating with the relatively-long half-cycle flashes occasioned by the main flashing-switch 90, the differences existing at the start of the relative movement between the shafts 133 and 150 being indicated in Fig. 4. It will be understood, of course, that as the speed of the vehicle decreases more and more below 10 M. P. H., the speed of the secondary shaft 133 (a rate corresponding to 10 M. P. H) will to a greater and greater extent exceed the speed of the vehicle-driven primary-shaft 150 so that the auxiliary flashing-switch 108 will be operated at increasingly rapid intervals.

The change in the rate of operation of the auxiliary flashing-switch 108 as above described will cause the very brief flashes occasioned by the said switch to shift in position with respect to the half-cycle flashes occasioned by the main flashing-switch 90, as indicated in Fig. 4 by the broken-line short-flash of the speed - indicating light 78.

If when the speed of the vehicle has diminished below 10 M. P. H. as above described, the direction-signal switch 191 is moved to indicate a left direction of travel, signals corresponding to those shown in Fig. 5 will be given. If, on the other hand, the direction-signal switch 191 is moved to indicate a right direction of travel, signals corresponding to those shown in Fig. 6 will be given.

When the speed of the vehicle entirely ceases and the same is stationary, the signals given will be the standstill signals previously described.

The preceding description of the operation of the signaling-system during the diminution in speed of the vehicle covered the effect produced when the vehicle was being operated under conventional drive, i. e., when the free-wheeling control-lever 103ᵇ was in its conventional drive position.

Let it now be supposed that the vehicle is coasting along at a speed in excess of 20 M. P. H., with the lever 103ᵇ set in its free-wheeling position (and hence the manual free-wheeling switch 104 in its closed-circuit position) and the accelerator-pedal 81 relieved of foot pressure.

Under these conditions, the speed-indicating light 78 will be constantly illuminated, while the complementary speed - indicating light 77 will flash on and off in conjunction therewith, as indicated in Fig. 19.

If during the condition just above described the direction-signal switch 191 should be operated to indicate a left direction of travel, the speed-indicating light 77 will cease flashing in conjunction with the complementary light 78, and the left-direction light 189 will be substituted therefor, as indicated in Fig. 20. If on the other hand the direction-signal switch 191 is thrown to indicate a right direction of travel, under the conditions recited above the speed-indicating light 77 would flash on and off in conjunction with a continuous illumination of the right-direction light 190 as indicated in Fig. 21. If desired, however, by a very simple change in the connections, the signal last described can be made to cause the steady illumination of the speed-indicating light 78 together with a flashing of the right-direction light 190—a situation just the reverse of that indicated in Fig. 20.

When the speed of the vehicle, under the conditions just above recited, diminishes below 20 M. P. H., the centrifugal governor 157 will act to restore the centrifugal switch 165 to its closed-circuit position, thereby reenergizing the electromagnet 171 to effect the re-starting of the motor 141 and also to disengage the blade 173 of the magnetic free-wheeling switch 174 from the contact 175, thereby breaking the circuit previously established by the closing of the manual free-wheeling switch 104.

The signals given during the diminution in speed of the vehicle below 20 M. P. H. under a free-wheeling set-up will correspond to those above described in connection with the similar diminution in speed when the set-up is for conventional drive.

If under certain conditions, such for instance as in foggy weather, it is desired to insure the illumination of the speed-indicating lights 77 and 78 at maximum brilliancy, rather than at less-than-maximum brilliancy, as sometimes occurs, as above described, the manual dimmer-cutout switch 66 may be moved into its closed-circuit position and the desired result thus achieved, inasmuch as when the said switch 66 is in its closed-circuit position, it provides a shunt circuit around the dimming resistance 123.

The closing of the said manual dimmer-cutout switch 66 also insures the concurrent flashing at maximum brilliancy of speed-indicating lights 77 and 78 at speeds above 20 M. P. H. when the particular set-up of the operating features of the vehicle otherwise causes an open-circuit condition to exist between the main wire 64 and the lights 77 and 78, whereas, under the conditions referred to, in the absence of the closing of the said switch 66, the said lights 77 and 78 would not be energized at speeds above 20 M. P. H. in the particular embodiment herein chosen for the illustration of the present invention.

A brief description will now be given of the signals given when the transmission is set to effect the reverse travel of the vehicle.

To effect the reverse travel of the vehicle, the gear-shift lever 181ª is appropriately moved to shift the slide 181 rearwardly, which movement causes the thrust-shoe 180 thereon to flex the blade 182 of the backing-light switch 184 into engagement with the contact 183 and concurrently flex the blade 85 of the automatic dimmer-cutout switch 84 out of engagement with the contact 83 and into engagement with the contact 86.

The engagement of the blade 182 with the contact 183 serves to supply current to the backing-light 187 for the steady illumination thereof. The concurrent engagement of the blade 85 with the contact 86 serves to relieve the circuits supplying the speed-indicating lights 77 and 78 of dependence upon the brilliancy-control switch 76 and establishes a more direct path from the main wire 64 to the blade 89 of the main flashing-switch 90 to thereby supply current to the said speed-indicating lights 77 and 78 independently of the brilliancy-control switch 76. The engagement of the blade 85 with the contact 86 also serves to relieve the direction-light circuits of dependence upon the said brilliancy-control switch 76 and establishes more direct paths independently thereof, as may readily be traced by reference to Fig. 1.

Under the conditions just above described, the signal given will include in addition to the constant illumination of the backing-light 187 the alternate flashing at maximum brilliancy of the speed-indicating lights 77 and 78. A very brief flashing of the speed-indicating light 78 will occur concurrently with the longer flashing of the complementary light 77, this being caused by the action of the auxiliary flashing-switch 108.

At this time it must be borne in mind that since the vehicle is moving in reverse direction, the primary shaft 150 will be rotating in a direction opposite from normal and opposite to the direction in which the secondary shaft 133 is being rotated by the motor 141. Thus the relative speeds between the cam-heads 132 and 135 are much increased over those which can occur during the forward travel of the vehicle, with the result that the auxiliary flashing-switch 108 will be operated with greater rapidity as compared to the main flashing-switch 90, and as the speed of the vehicle increases in reverse direction, it will effect the appearance of a multiplicity of brief flashes during each half-cycle flash of the speed-indicating light 77, rather than but a single brief flash, as is the case when the vehicle is at a standstill or traveling in a forward direction. The signal given as above described is graphically represented in Fig. 36.

If during the backward movement of the vehicle the blade 192 of the direction-signal switch 191 should be moved to the left, while the accelerator-pedal 81 is free of foot pressure, a signal corresponding to that indicated in Fig. 32 will be given, in which figure it will be noted the speed-indicating light 77 ceases to flash and the left-direction light 189 flashes in its stead.

If on the other hand during the backward movement of the vehicle as above described, the accelerator-pedal 81 is depressed while the blade 192 is in its left position, a signal will be given corresponding to that shown in Fig. 34, in which figure it will be noted that the left-direction light 189 is steadily illuminated and both the speed-indicating lights 77 and 78 are alternately flashing.

In Fig. 33 is represented the signals given when the vehicle is moving with the accelerator idle and the direction-signal switch-blade 192 moved to the right for indicating a right rearward turning movement. Fig. 35 represents the signal given under the conditions just described save that the accelerator-pedal 81 is depressed.

From the foregoing it will be seen that various readily-understood signals are given to an extraneous observer, such for instance as the driver of a following vehicle, to guide the latter in his movements with respect to the vehicle equipped with the present invention. The signals produced by the apparatus herein illustrated may be varied considerably but in most respects are readily comprehended by an observer with little or no previous instruction. For instance, the brief flashing caused by the auxiliary flashing-switch 108 during the reverse travel of the vehicle is of much greater frequency and hence of a more arresting nature than when the vehicle is either standing still or moving in a forward direction.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A signaling system for vehicles, including two signal-lights; a source of electrical energy; conducting-means for interconnecting the said source of electrical energy and the said signal-lights; automatic flashing-switch means timed by a running part of a vehicle and acting to cause pulsations in the current-flow in the said conducting-means varying with the speed of the vehicle; and selecting-switch means constructed to selectively divert the said current-pulsations to the said signal-lights concurrently or alternately and operated by a speed-control member of the vehicle as an incident to the movement of such speed-control member.

2. A signaling system for vehicles, including two signal-lights; a source of electrical energy; conducting-means for interconnecting the said source of electrical energy and the said signal-lights; automatic flashing-switch means timed by a running part of a vehicle and acting to cause pulsations in the current-flow in the said conducting-means; and selecting-switch means automatically shiftable by a speed-controlling feature of the vehicle and constructed to selectively divert the said current-pulsations to the said signal-lights concurrently or alternately as an incident to the normal operation of the said speed-controlling feature.

3. A signaling system for vehicles, including a speed-indicating light; a pair of complementary direction-indicating lights; a source of electrical energy; conducting-means for conducting current from the said source of electrical energy to the said lights; and means including a driven-member changing in speed in response to changes in the speed of the vehicle and affecting the current-flow in the said conducting means to cause the automatic flashing of one or the other of the said direction-indicating lights alternately with the said speed-indicating light.

4. A signaling system for vehicles, including two signal-lights; a source of electrical energy; conducting-means for conducting current from the said source of electrical energy to the said lights; means changing its speed in response to changes in speed of the vehicle and acting to cause pulsations in the current-flow in the said conducting-means; and double-throw selecting-switch means automatically shiftable by a speed-controlling feature of the vehicle and acting when in one position to divert the said pulsations to one of the said lights, and when in another position to divert a steady current thereto and at the same time direct pulsations to the other of the said lights.

5. A signaling system for vehicles, including a speed-indicating light; a pair of complementary direction-indicating lights; a source of electrical energy; conducting-means for conducting current from the said source of electrical energy to the said lights; flashing-switch means driven and timed by a running feature of the vehicle and affecting the current-flow in the said conducting-means to cause the flashing of the said speed-indicating light; a directional signal-switch; an accelerator-operated switch in series with the said directional signal-switch; and electromagnetic means under the joint control of the said directional signal- and accelerator-operated switches for selectively cutting-in and cutting-out at least one of the said direction-indicating lights for control by the said flashing-switch means.

6. A signaling system for vehicles, including two signal-lights; a source of electrical energy; conducting-means for interconnecting the said source of electrical energy and the said signal-lights; automatic flashing-switch means timed by a running part of a vehicle and acting to cause pulsations in the current-flow in the said conducting-means to cause the flashing of one of the said signal-lights; and means for supplying current to at least one of the said signal-lights to cause the steady illumination thereof independently of the flashing action of the said flashing-switch means and concurrently with the flashing of the first-mentioned signal-light by the said flashing-switch means.

7. A signaling system for vehicles, including two signal-lights; a source of electrical energy; conducting-means for interconnecting the said source of electrical energy and the said signal-lights; automatic flashing-switch means timed by a running part of a vehicle and acting to cause pulsations in the current-flow in the said conducting-means to cause on occasion the flashing of both of said signal-lights; and means for supplying steady current to one of the said signal-lights to cause the steady illumination thereof independently of the flashing action of the said flashing-switch means and concurrently with the action of the latter in flashing another of said signal-lights.

8. A signaling system for vehicles, including two signal-lights; a source of electrical energy; conducting-means for interconnecting the said source of electrical energy and the said signal-lights; automatic flashing-switch means timed by a running part of a vehicle and acting to cause pulsations in the current flow in the said conducting-means, to cause the flashing of the said signal-lights; and means automatically shiftable by a control feature of the vehicle and acting to supply current to one of the said signal-lights to cause the steady illumination thereof independently of the flashing action of the said flashing-switch means and concurrently with the action of the latter in flashing another of said signal-lights.

9. A signaling system for vehicles, including two signal-lights; a source of electrical energy; conducting-means for conducting current from the said source of electrical energy to the said signal-lights; automatic-switch means operated by a running part of a vehicle at a rate of speed varying with the speed of the vehicle and acting to cause pulsations in the current-flow in the said conducting-means to cause the alternate energization of first one and then the other of the said signal-lights; and means for supplying current to at least one of the said signal-lights to cause the steady illumination thereof independently of the flashing action of the said automatic-switch means.

10. A signaling system for vehicles, including two speed-indicating lights; a pair of complementary direction-indicating lights; a source of electrical energy; conducting-means for interconnecting the said source of electrical energy with the said lights; automatic flashing-switch means operated by a running part of a vehicle at a rate of speed varying with the speed of the vehicle and acting to cause pulsations in the current-flow in the said conducting-means; and means for supply steady current to at least one of the said direction-indicating lights for the steady illumination thereof independently of the flashing action of the said flashing-switch means at the same time that the latter is acting to cause the flashing of at least one of the said speed-indicating lights.

11. A signaling system for vehicles, including a signal-light; a source of electrical energy; conducting-means for conducting current from the said source of electrical energy to the said light; means operated by a running part of the vehicle and acting to cause pulsations in the current-flow in the said conducting-means of a periodicity varying with the speed of the vehicle; means operating at a speed substantially independent of the speed of the vehicle and also acting to cause pulsations in the current flow in the said conducting-means; and driving-means actuating the last said means in the manner just specified.

12. A signaling system for vehicles, including a signal-light; a source of electrical energy; conducting-means for conducting current from the said source of electrical energy to the said light; flashing-switch means operated by a running part of the vehicle and acting to cause pulsations of relatively-brief duration in the current-flow in the said conducting-means of a periodicity varying with the speed of the vehicle; means operating at a speed substantially independent of the speed of the vehicle and acting to cause pulsations of relatively-long duration in the current-flow in the said conducting-means; and driving-means actuating the last said means in the manner just specified.

13. A signaling system for vehicles, including a signal-light; a source of electrical energy; conducting-means for interconnecting the said source of electrical energy and the said signal-light; flashing-switch means acting to cause current pulsations in the said conducting-means; first automatic driving-means changing in speed with the speed of the vehicle and controlling the frequency-rate of the said flashing-switch means when the speed of the vehicle is above a predetermined speed; and second automatic driving-means operating at a speed independent of the speed of the vehicle and acting to control the frequency-rate of the said flashing-switch means when the speed of the vehicle falls below the said predetermined speed.

14. A signaling system for vehicles, including a signal light; a source of electrical energy; conducting-means for interconnecting the said source of electrical energy and the said signal-light; flashing-switch means acting to cause current pulsations in the said conducting-means; first automatic driving-means changing in speed with the speed of the vehicle and controlling the frequency-rate of the said flashing-switch means when the speed of the vehicle is above a predetermined speed; and electric motor operating at a speed independent of the speed of the vehicle and acting to control the frequency-rate of the said flashing-switch means when the speed of the vehicle falls below the said predetermined speed; and a centrifugal switch operated by a running part of the vehicle and acting to energize the said electric motor when the speed of the vehicle falls below a predetermined minimum.

15. A signaling system for vehicles, including a signal-light; a source of electrical energy; conducting-means for interconnecting the said source of electrical energy and the said signal-light; a flashing-switch; actuating-means for the said flashing-switch including two relatively-movable members both constructed to cooperate in effecting the operation of the said flashing-switch and the rate of relative movement between which determines the operating-speed of the said flashing-switch, one of the said members being connected to a moving part of a vehicle for being driven thereby at speeds changing with the speed of the vehicle; and an electric motor connected to the other member of the said actuating-means for driving the same at a speed independent of the speed of the vehicle.

16. A signaling system for vehicles, including a signal-light; a source of electrical energy; conducting-means for interconnecting the said source of electrical energy and the said signal-light; a flashing-switch; actuating-means for the said flashing-switch including two relatively-movable members, one of which is connected to a moving part of a vehicle for being actuated thereby; an electric motor connected to the other member of the said actuating-means for driving the same; and a centrifugal switch operated by a running part of the vehicle and acting to energize the said electric motor when the speed of the vehicle falls below a predetermined speed and also acting to de-energize the said motor when the vehicle speed rises above a predetermined speed.

17. A signaling system for vehicles, including a signal-light; a source of electrical energy; conducting-means for interconnecting the said source of electrical energy and the said signal-light; a resistance-unit, flashing-switch means acting through the said resistance-unit to cause the flashing of the said signal-light relatively dimly; and second flashing-switch means acting to cause the briefer and more brilliant flashing of the said signal-light as compared to the flashing thereof occasioned by the first-mentioned flashing-switch means.

18. A signaling system for vehicles, including a signal-light; a source of electrical energy; conducting-means for interconnecting the said source of electrical energy and the said signal-light; a resistance-unit, flashing-switch means acting through the said resistance-unit to cause the flashing of the said signal-light; and second flashing-switch means acting to cause the briefer and more brilliant simultaneous flashing of the said signal-light as compared to the flashing thereof occasioned by the first-mentioned flashing-switch means.

19. A signaling system for vehicles, including two signal-lights; a source of electrical energy; conducting-means for interconnecting the said source of electrical energy and the said signal-lights; a resistance-unit, flashing-switch means acting through the said resistance-unit to cause the concurrent flashing of the said signal-lights; and second flashing-switch means acting to cause the briefer and more brilliant flashing of the said signal-lights as compared to the flashing thereof occasioned by the first-mentioned flashing-switch means.

20. A signaling system for vehicles, including two signal-lights; a source of electrical energy; conducting-means for interconnecting the said source of electrical energy and the said signal-lights; a resistance-unit flashing-switch means acting through the said resistance-unit to cause the flashing of one of the said signal-lights; and second flashing-switch means acting to cause the briefer and more brilliant flashing of the other of the said signal-lights as compared to the flashing of the complementary signal-light occasioned by the first-mentioned flashing-switch means.

21. A signaling system for vehicles, including two signal-lights; a source of electrical energy; conducting means for interconnecting the said source of electrical energy and the said signal-lights; flashing-switch means acting to cause the alternate flashing of the said signal-lights; and second flashing-switch means acting to cause the briefer flashing of one of the said signal-lights as compared to the flashing occasioned by the first-mentioned flashing-switch means.

22. A signaling system for vehicles, including two signal-lights; a source of electrical energy; conducting-means for interconnecting the said source of electrical energy and the said signal-lights; flashing-switch means acting to cause the alternate flashing of the said signal-lights; and second flashing-switch means acting to cause the briefer flashing of both of the signal-lights as compared to the alternate flashing occasioned by the first-mentioned flashing-switch means.

23. A signaling system for vehicles, including a signal-light; a source of electrical energy; conducting-means for interconnecting the said source of electrical energy and the said signal-light; switch-means controlled by one of the operating members of a vehicle and acting when moved to change the periodicity of the current supplied to the said signal-light; and second switch-means controlled by another operating member of the vehicle and connected into the system in such manner as to restore the current supplied to the said light to the periodicity which it had previously to the operation of the first-mentioned switch-means.

24. A signaling system for vehicles, including two signal-lights; a source of electrical energy; conducting-means for interconnecting the said source of electrical energy and the said signal-lights; automatic flashing-switch means timed by a running part of a vehicle and acting to cause pulsations in the current flow in the said conducting-means to cause the flashing of the said signal-lights; first switch-means controlled by one of the movable operating features of the vehicle; and second switch-means having two different circuit-closing positions and controlled by another movable operating-feature of the vehicle; the said first switch-means and the said second switch-means being both connected to the said conducting-means in such manner that when the said second switch-means is in one of its two circuit-closing positions the current flow in the said conducting-means is dependent upon the position of the said first switch-means, and when the said second switch-means is in the other of its circuit-closing positions the current flow in the said conducting-means is independent of the setting of the said first switch-means.

25. In a signaling system for vehicles, including a signal-light; a source of electrical energy; conducting-means for interconnecting the said source of electrical energy and the said signal-light; automatic flashing-switch means timed by a running part of a vehicle and acting to cause pulsations in the current flow in the said conducting-means to cause the flashing of the said signal-light; a centrifugal-switch timed by a running part of the vehicle; and second switch-means having two different circuit-closing positions and controlled by a movable operating-feature of the vehicle; the said centrifugal-switch and the said second switch-means being both connected to the said conducting-means in such manner that when the said second switch-means is in one of its two circuit-closing positions the current flow in the said conducting-means is dependent upon the position of the said centrifugal-switch, and when the said second switch-means is in the other of its circuit-closing positions the current flow in the said conducting-means is independent of the position of said centrifugal-switch.

26. A signaling system for vehicles, including a signal-light; a source of electrical energy; conducting-means for interconnecting the said source of electrical energy with the said signal-light; a resistance-unit; flashing switch-means acting through the said resistance-unit to cause flashes of the said signal-light which are both relatively dim and of relatively-long duration; and second switch-means acting to cause briefer and more brilliant flashing of the said signal-light as compared to that occasioned by the first-mentioned flashing switch-means; the said relatively-brief and more brilliant flashes of the said signal-light occurring during the relatively-dim flashes of longer duration thereof.

27. A signaling system for vehicles, including an electrically-operated signal; a source of electrical energy; conducting-means interconnecting the said source of electrical energy with the said signal; and automatic switch-means acting to cause pulsations in the current supplied to the said signal and operating to progressively increase the pulsation rate in the current supplied to the said signal as the forward speed of the vehicle decreases.

28. In a signaling system for vehicles, including a signal-light; a source of electrical energy; conducting means interconnecting the said source of electrical energy and the said signal-light; automatic flashing switch-means operating at a speed substantially independent of the speed of the vehicle and acting to cause pulsations in the current flow to the said signal-light; and second flashing switch-means operating at speeds changing with the speed of the vehicle and acting to cause pulsations in the current supplied to the said signal-light of a frequency rate differing from the rate of pulsations caused by the first said flashing switch-means.

29. In a signaling system for vehicles, the combination with a signal-light; of means for causing relatively-dim and relatively-long flashes in the said signal-light; in combination with means causing relatively-brilliant and relatively-short flashes in the said signal-light at the same time that the said relatively-dim and relatively-long flashes are being imparted thereto.

30. In a signaling system for vehicles, the combination with a signal-light; of means for causing relatively-dim and relatively-long flashes in the said signal-light; in combination with means for causing relatively-brilliant and relatively-short flashes in the said signal-light at the same time that the said relatively-dim and relatively-long flashes are being imparted thereto but at a different frequency rate.

31. A signaling system for vehicles, including a speed-indicating light; a pair of complementary direction-indicating lights; a source of electrical energy; conducting-means for conducting current from the said source of electrical energy to the said lights; flashing-switch means driven and timed by a running part of the vehicle and affecting the current-flow in the said conducting-means to cause the flashing of the said speed-indicating light; a directional-signal switch; an accelerator-operated switch; and electromagnetic-means for selectively cutting in and cutting out at least one of said direction-indicating lights for control by the said flashing-switch means; the said electromagnetic-means being connected into the system in such manner as to be responsive only to the joint operation of the said directional-signal and accelerator-operated switches.

32. A signaling system for vehicles, including a signal-light; a source of electrical energy; conducting-means for interconnecting the said source of electrical energy and the said signal-light; power-driven switch controlling the energization of the said signal-light; actuating-means for the said automatic switch, including two relatively-movable members, both of which are constructed and arranged to cooperate in effecting the operation of the said automatic switch, one of the said members being driven by the movement of the vehicle at speeds changing with the speed thereof; driving-means connected to the other member of the said actuating-means for driving the same at a speed independent of the speed of the vehicle; and one-way coupling-means constructed and arranged to cause the one of the said members which is driven by the vehicle to drive the other of said members when the speed of the vehicle-driven member exceeds the speed of the other of said members.

33. A signaling system for vehicles, including a signal-light; a source of electrical energy; conducing-means for interconnecting the said source of electrical energy with the said signal-light; automatic flashing-switch means operated by a running part of a vehicle at a rate of speed varying with the speed of the vehicle and acting to cause pulsations in the current-flow in the said conducting-means; and second automatic flashing-switch means operating at a speed independent of the speed of the vehicle and electrically connected in the system in such manner as to periodically interrupt the pulsations caused by first-mentioned automatic switch-means.

HENRY S. DAVIS.